United States Patent [19]
Kurtin et al.

[11] 3,790,886
[45] Feb. 5, 1974

[54] ELECTRICAL MEASUREMENT INSTRUMENT HAVING AN IMPROVED ANALOG TO DIGITAL CONVERTER

[75] Inventors: Stephen Kurtin; Michael Anthony, both of Pasadena; Willis Watrous, Saratoga, all of Calif.

[73] Assignee: Keithley Instruments, Inc., Solon, Ohio

[22] Filed: Oct. 4, 1971

[21] Appl. No.: 186,006

[52] U.S. Cl. ......... 324/99 D, 324/111, 340/347 AD, 340/347 NT
[51] Int. Cl. ...................... G01r 17/06, H03k 13/10
[58] Field of Search ........ 324/99 D, 99 R, 111, 120; 340/347 AD, 347 NT

[56] References Cited
UNITED STATES PATENTS

| | | | |
|---|---|---|---|
| 3,458,809 | 7/1969 | Dorey | 324/99 R |
| 3,500,384 | 3/1970 | Naydan et al. | 340/347 AD |
| 3,566,397 | 2/1971 | Walton | 340/347 AD |
| 3,051,939 | 8/1962 | Gilbert | 324/99 D |

*Primary Examiner*—Rudolph V. Rolinec
*Assistant Examiner*—Ernest F. Karlsen
*Attorney, Agent, or Firm*—Yount & Tarolli

[57] ABSTRACT

An electrical measuring instrument is disclosed which may be used for measuring the magnitude of an unknown source, such as the magnitude of an A.C. signal, or the magnitude and polarity of a D.C. signal, or the resistance of a resistor. A voltage signal is developed having a magnitude dependent on the unknown source and this signal is applied to an analog to digital converter which employs a capacitor, a charging circuit and a discharging circuit. The capacitor charges at a rate dependent on the magnitude of the voltage signal. The stored energy crosses a given level and, then, in response to a clock pulse the capacitor is discharged at a known rate. The capacitor discharges through a particular level and the charging operation is thereafter commenced in response to another clock pulse. Counter and logic circuitry serve to provide an output indication of the magnitude of the unknown source as a function of a relationship of the number of clock pulses occurring during the discharge operations and a fixed number of clock pulses. Autoranging circuitry serves to sequentially uprange and downrange the scaling of the magnitude of an input signal prior to being applied to the analog to digital conversion circuitry. Other features are disclosed.

21 Claims, 6 Drawing Figures

ELECTRICAL MEASUREMENT INSTRUMENT HAVING AN IMPROVED ANALOG TO DIGITAL CONVERTER

This invention relates to the art of electrical measuring instruments and, more particularly, to such instruments for measuring the magnitude of an unknown resistor or of an unknown A.C. source or of an unknown D.C. source as well as indicating the polarity of the latter.

One object of the present invention is to provide an electrical measuring instrument with an analog to digital converter which does not require that a capacitor or the like be charged or discharged for a fixed period of time.

Another object of the present invention is to provide an improved analog to digital converter which does not require that a capacitor or the like be charged or discharged to a specific level.

It is a still further object of the present invention to provide an improved analog to digital converter having an energy storage means such as a capacitor and circuitry for alternately charging and discharging the capacitor so that the stored energy crosses a given level and then in response to the occurrence of a clock pulse a change in the charging and discharging modes of operation is obtained.

It is a still further object of the present invention to provide an analog to digital converter wherein its mode of operation is not dependent on a clock source having a fixed frequency.

It is a still further object of the present invention to provide an electrical measuring instrument having circuitry for sequentially upranging and sequentially downranging the scaling of the magnitude of an input signal prior to its application to an analog to digital converter.

It is a still further object of the present invention to provide an electrical measuring instrument incorporating circuitry for determining the polarity of a D.C. signal as well as measuring the magnitude thereof with the use of an analog to digital converter circuit.

It is a still further object of the present invention to provide an improved electrical measuring instrument employing input circuitry for applying a unipolar signal to an analog to digital converter independently of the polarity of an input signal applied to the instrument.

It is a still further object of the present invention to provide circuitry for protecting an input amplifier to an analog to digital converter from damage due to an application of an overvoltage thereto when the instrument is being used for measuring resistance.

It is a still further object of the present invention to provide an autorange circuit for an electrical measuring instrument for controlling visual display means to provide an indication of an outrange condition with this indication taking place at different levels when measuring A.C. signals or D.C. signals or resistance.

In accordance with the present invention the analog to digital converter includes an energy storage means, such as a capacitor, a charging circuit for storing energy in the storage means at a rate dependent on the magnitude of an analog signal, and a discharging circuit for discharging energy from the storage means at a relatively constant rate. An output indication is provided each time the stored energy crosses a particular level during both charging and discharging operations. The charging and discharging operations alternate with each commencing in dependence upon concurrent occurrence of an output indication and a clock pulse.

In accordance with a more limited aspect of the present invention two counters are provided, one for counting a fixed number of clock pulses and the other for counting a variable number of clock pulses dependent on the number of clock pulses occurring during the discharge operations and an output indication of the magnitude of the unknown source is provided in dependence upon the number of pulses counted by the two counters.

In accordnace with a still further aspect of the present invention the discharging circuit includes switching means for completing a discharge path to a reference point exhibiting a substantially constant D.C. level.

In accordance with a still further aspect of the present invention an input circuit is provided for applying a unipolar signal to the analog to digital converter independently of the polarity of the input analog signal.

The foregoing and other objects and advantages of the present invention will become more readily understood from the following description of a preferred embodiment of the present invention taken in conjunction with the accompanying patent drawings which are a part hereof and wherein:

Figure 1:
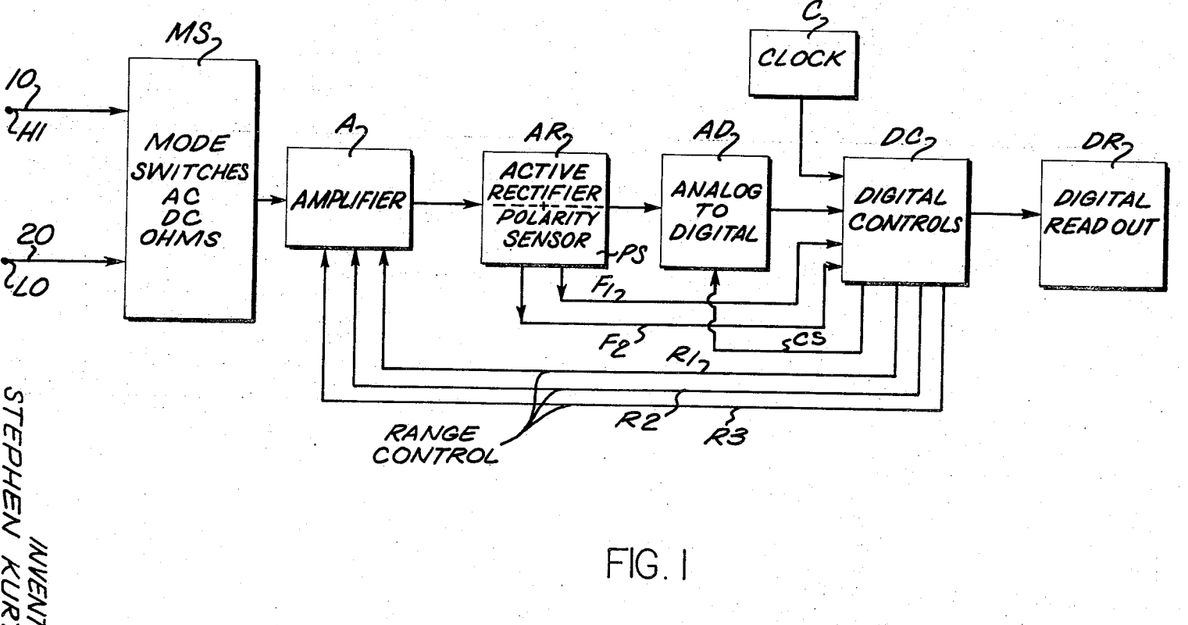
FIG. 1 is a block diagram illustration of the preferred embodiment of the invention.

Referring now to the drawings wherein the showings are for purposes of illustrating a preferred embodiment of the invention only and not for purposes of limiting same, FIG. 1 shows an electrical measuring instrument in accordance with the invention, having high and low input terminals 10 and 20. These terminals are connected to mode switches MS which are selectively positioned in dependence upon the unknown source being measured; to wit, measuring an A.C. analog signal, a D.C. analog signal or for ohm measurements. Regardless of the mode of operation, the output signal obtained from the mode switches is in the form of an analog voltage having a magnitude in dependence upon that of the unknown source. This voltage signal is applied to a high input impedance amplifier A and the amplified signal is applied to an active rectifier AR and a polarity sensor PS. The active rectifier serves to provide a unipolar analog output voltage of a given polarity regardless of the polarity of the input signal with the magnitude thereof varying in dependence upon that of the unknown source. The polarity sensor PS provides output signals on function lines F1 and F2 indicative of the mode of operation involved and of the polarity of the unknown signal when a D.C. signal is being measured. The unipolar analog output voltage is applied to an analog to digital converter AD which operates in conjunction with digital controls DC under the control of a clock source C to convert the analog signal into a corresponding digital signal which is displayed by a visual digital readout DR. The apparatus serves to measure the magnitude of the unknown source over different ranges of values. If the instrument is set up in its lowest operating range it will sense whether the magnitude of the unknown source exceeds the selected range and, if so, a range control circuit included in the digital controls DC will actuate one or more of the output circuits R1, R2 and R3 to sequentially uprange the instrument to effect a scaling operation on the magnitude of analog voltage applied to amplifier A. Conversely, the range control circuit serves to sequentially downrange the instrument from one range to the next if the magnitude of the unknown source is below the range in operation. As will be described in greater detail hereinafter, if the magnitude of the unknown source exceeds the uppermost range of the instrument then a visual indication will be presented to the operator. Having briefly described the general operation of the instrument, attention is now directed to the specific circuits employed.

MODE SWITCHES, INPUT AMPLIFIER AND SCALING CIRCUITS

Figure 2:
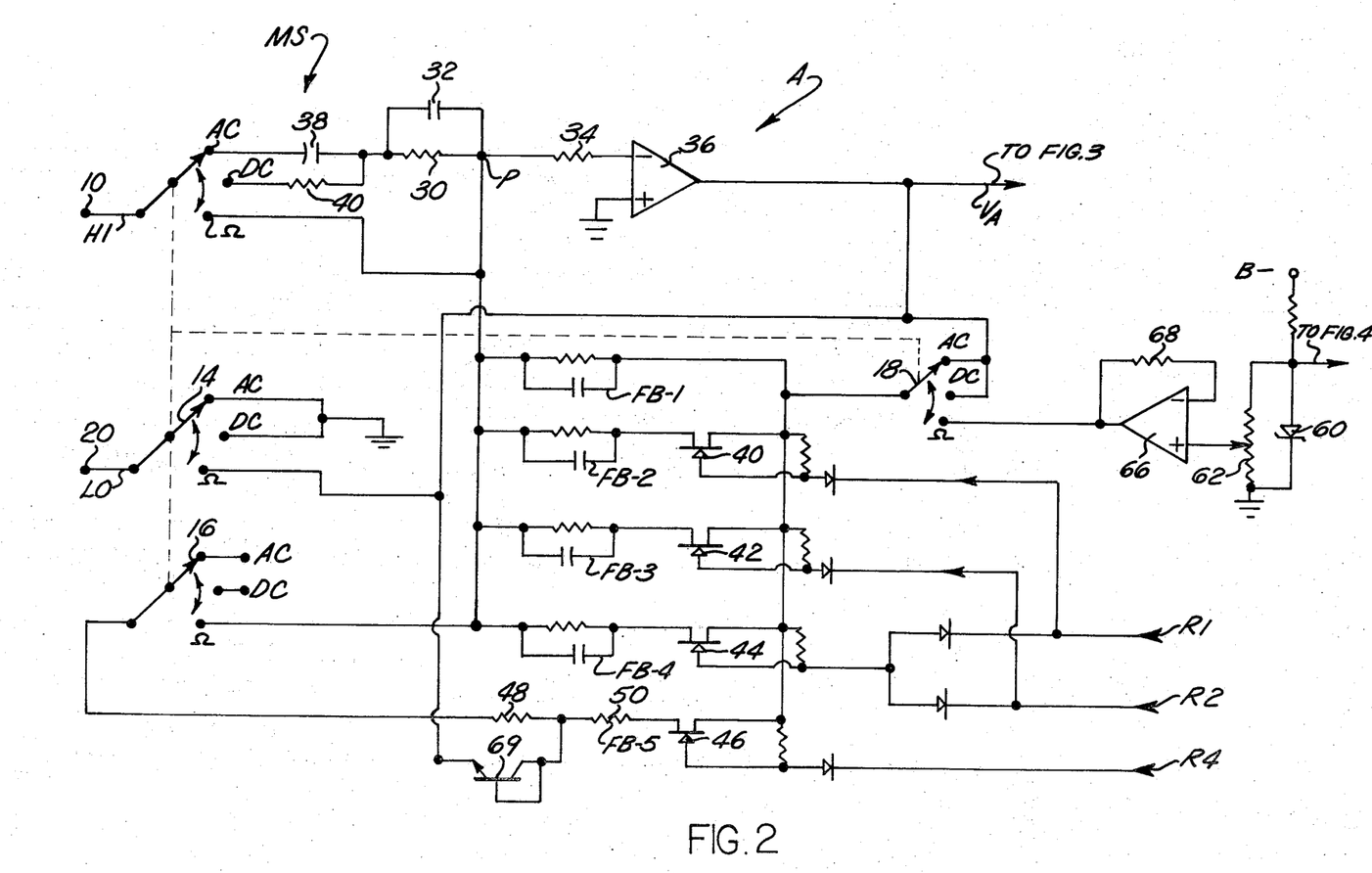
FIG. 2 is a combined schematic-block diagram illustration of the mode switch and input circuit arrangement of the invention.

The instrument employs mode switches for use by an operator in selecting the mode of operation to be employed; to wit, measurement of ohms, an unknown D.C. signal, or an unknown A.C. signal. The mode switches MS include six three position ganged switches 12, 14, 16 and 18 (see FIG. 2), 22 and 24 (see FIG. 3). Referring now to FIG. 2, it is contemplated that the unknown source, whether it take the form of an A.C. source, D.C. source or a resistor, be connected across the high-low input terminals 10 and 20. The mode switches are then positioned to the appropriate position for measuring the magnitude of an A.C. signal, a D.C. signal or for measuring ohms.

When the instrument is utilized for measuring either an A.C. source or a D.C. source, one end of the source is grounded through mode switch 14 and the other end of the source is connected to amplifier A through mode switch 12. Amplifier A has an input circuit including a resistor 30 connected in parallel with a capacitor 32, both connected in series with a resistor 34 to the inverting input of a high input impedance inverting amplifier 36, having its non-inverting input connected to ground. An A.C. signal to be measured is applied to the input circuit of amplifier A through coupling capacitor 38, whereas a D.C. signal to be measured is applied through a resistor 40. The gain of amplifier A is dependent upon which one or combination of a plurality of feedback paths or scaling circuits are placed in operation. These are feedback circuits FB-1, FB-2, FB-3 and FB-4, each having one end connected in common to the inverting input of amplifier 36. Normally, in the lowest range of operation feedback circuit FB-1 is placed in operation for either A.C. or D.C. operations through mode switch 18, which connects the feedback circuit to the output of amplifier 36. Each of these feedback circuits includes a parallel resistor capacitor network to achieve different gain characteristics. In the lowest range of operation, feedback circuit FB-1 is in operation, and as the instrument is sequentially upranged, feedback circuit FB-2 is connected in parallel with circuit FB-1 and then circuit FB-3 is connected in parallel with circuit FB-1, and then in the uppermost range circuits FB-2, FB-3 and FB-4 are placed in parallel with circuit FB-1. The instrument is sequentially downranged in the opposite fashion. Feedback circuits FB-2, FB-3 and FB-4 are selectively actuated by signals carried by ranging circuits R1 and R2. Normally these circuits carry negative signals, and on command from the digital control circuit (see FIG. 5) one or the other, or both, circuits R1 and R2 will carry a positive signal. Thus, when circuit R1 carries a positive signal this will bias field effect transistor 40 into conduction to activate feedback circuit FB-2. When circuit R2 carries a positive signal this will bias field effect transistor 42 into conduction so as to activate feedback circuit FB-3. However, when both range circuits R1 and R2 carry positive signals then field effect transistor 44 is forward biased to activate feedback circuit FB-4.

When the mode switches are positioned for measuring ohms, a fifth operating range is available upon activating feedback circuit FB-5. Thus, when the digital controls DC (see FIG. 5) provide a positive signal on range control circuit R4, field effect transistor 46 is forward biased to activate this feedback circuit which includes series connected resistors 48 and 50. However, in this mode of operation feedback circuits FB-1 through FB-5 are not connected as feedback circuits for amplifier 36. Instead, they serve as input impedance networks to provide the scaling function. The unknown resistor to be measured is connected between terminals 10 and 20, and with the mode switches properly positioned for reading ohms, the unknown resistor is connected between input point P and the output of amplifier 36. A constant voltage source is used for measuring the value of this resistor. This source is obtained from a Zener reference circuit including a Zener diode 60 connected across the resistance portion of a potentiometer 62 between ground and through a resistor 64 to a B- voltage supply source. The wiper arm of potentiometer 62 is connected to the non-inverting input of a relatively low input impedance operational amplifier 66 having its output circuit connected through a resistor 68 to the inverting input thereof. The Zener referenced output voltage from amplifier 66 is applied through mode switch 18 to the appropriate scaling or feedback circuit FB-1 through FB-5.

A protection circuit is provided to protect amplifier A from damage in the event a large voltage is placed across terminals 10 and 20 when the instrument is in the ohm measuring mode. The circuit includes a diode connected transistor 69 connected, as shown, in series with resistor 48 across terminals 10 and 20. Consequently, when an overvoltage is applied between terminals 10 and 20 so that approximately five volts is placed across transistor 69, the transistor will breakdown and conduct through resistor 48.

ACTIVE RECTIFIER AND POLARITY SENSOR CIRCUITS

The active rectifier AR serves to receive the output voltage $V_A$ (see FIG. 3) from input amplifier A and provide a unipolar output voltage $V_O$ in the form of a positive D.C. signal independently of the polarity of signal $V_A$ and of a magnitude which varies with that of signal $V_A$ and, hence, with that of the unknown source. The polarity sensor PS serves to provide signals on output circuits $F_1$ and $F_2$ which are connected to the digital controls DC (see FIGS. 1 and 5) indicative of whether the instrument is being employed for measuring ohms, an A.C. signal, or a D.C. signal and in the latter case whether the D.C. signal is a positive or negative signal.

Figure 3:
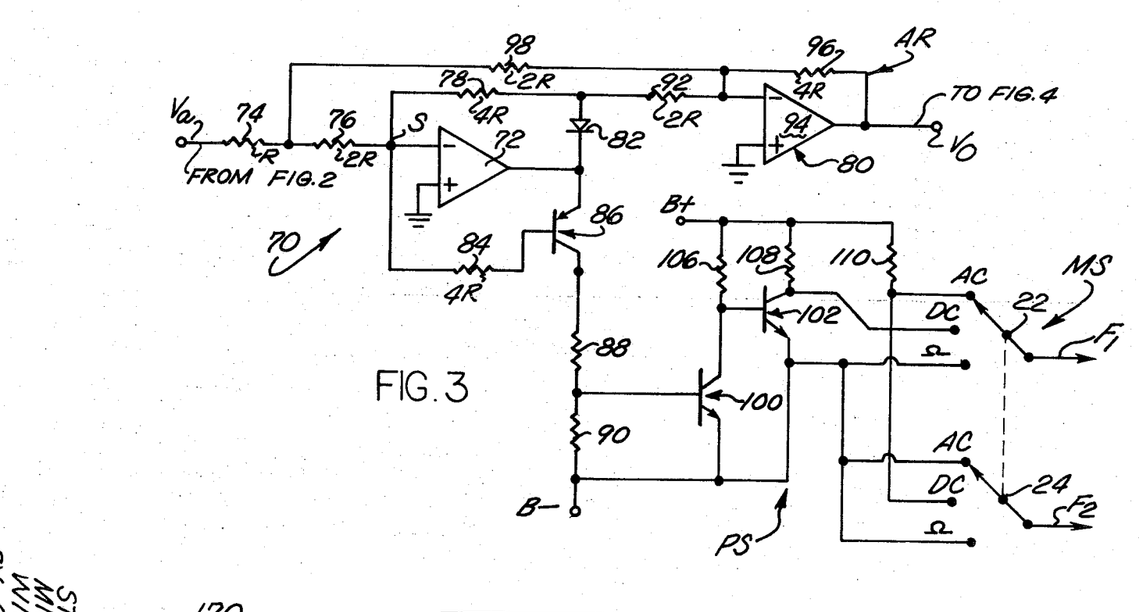
FIG. 3 is a schematic illustration of an active rectifier and polarity sensor circuit employed in the invention.

The active rectifier AR, as shown in FIG. 3, includes two inverting amplifying circuits 70 and 80. Circuit 70 includes an operational amplifier 72 having its non-inverting input connected to ground and its inverting input connected through two series connected resistors 74 and 76 to receive signal $V_A$. A first feedback circuit is connected between the input and output of amplifier 72 and includes a resistor 78 together with a diode 82, poled as shown. A second feedback circuit between these two points includes a resistor 84 and the emitter to base path of a PNP transistor 86 having its emitter connected to the output circuit of amplifier 72 and its collector connected through a pair of resistors 88 and 90 to a B-voltage supply source. The junction of resistor 78 and diode 82 is connected to amplifier circuit 80 through a resistor 92 to the inverting input of an operational amplifier 94, having its non-inverting input connected to ground. A feedback circuit for circuit 80 is connected between the output of amplifier 94 and the inverting input thereof and includes a resistor 96. The junction of resistors 92 and 96 is connected through a resistor 98 to the junction of resistors 74 and 76.

Resistor 74 may be considered as exhibiting a resistance value R, whereas resistors 76, 92 and 98 exhibit a resistance value of 2R and resistors 78, 84 and 96 each exhibit a resistance value of 4R. Consequently, if the input voltage signal $V_A$ is a D.C. signal of, for example, 1 volt positive and resistance R is equal to 5,000 ohms, then the value of the current flowing into the summing point S of amplifier 72 will be in the order of +0.05 milliamperes and, hence, the potential existing at the junction between resistors 78 and 92 will be on the order of −1 volt. A voltage drop will exist across diode 82 providing approximately −1.7 volts on the emitter of transistor 86. Consequently, transistor 86 is reverse biased. The portion of the output voltage of amplifier 94 due to the positive 1 volt level existing at the junction of resistors 78 and 92 will be approximately +2 volts, due to the gain of amplifier 80. However, approximately 0.5 volts will exist at the junction between resistors 74 and 76 and this voltage is amplified by amplifier 80 and inverted to obtain approximately −1 volt. Thus, the net output voltage $V_O$ will be +1 volt.

If the input signal $V_A$ is, for example, −1 volt, the operation which ensues is similar to that as described above with the exception that transistor 86 will be forward biased into conduction and the potential existing at the junction between resistors 78 and 92 will approach that of ground and the potential on the emitter of transistor 86 will be approximately +1.7 volts. The component of the output voltage $V_O$ due to the voltage existing at the junction of resistors 78 and 92 will, of course, be zero. With a negative input signal $V_A$ the potential existing at the junction of resistors 74 and 76 will be approximately −0.5 volts and this signal is amplified by the inverting amplifier 80 to provide an output voltage $V_O$ of 1.0 volts positive. From the foregoing, it is seen that the active rectifier AR serves to provide an output voltage $V_O$ which is always positive in polarity and of a magnitude which varies with that of the input voltage $V_A$.

The polarity sensor PS serves to provide output indications on function lines $F_1$ and $F_2$ indicative as to whether the instrument is being used for measuring ohms or A.C. voltage or D.C. voltage, and in the latter case the polarity involved. It will be recalled from the previous discussion that when voltage $V_A$ is positive, transistor 96 is reverse biased and is forward biased when the signal is negative. For polarity sensing those conditions are, in effect, amplified by the polarity sensor. The polarity sensor includes a pair of NPN transistors 100 and 102. Transistor 100 has its emitter connected to a B− voltage supply source and its collector collected through a resistor 106 to the B+ voltage supply source. The junction of resistors 88 and 90 is connected to the base of transistor 100. Similarly, the junction of the collector of transistor 100 and resistor 106 is connected to the base of transistor 102 which has its emitter connected to the B− voltage supply source and its collector connected to a B+ voltage supply source through a resistor 108. A resistor 110 connects the B+ voltage supply source to an A.C. output terminal for mode switch 22 and to a D.C. output terminal for mode switch 24. The collector of transistor 102 is connected to a D.C. output terminal for mode switch 22. The emitter of transistor 102 is connected to an ohm output terminal for mode switch 22 as well as to an ohm output terminal and an A.C. output terminal for mode switch 24.

In operation, when mode switches 22 and 24 are positioned for A.C. operation, output circuit $F_1$ carries a B+ signal whereas output circuit $F_2$ carries a B− signal. When the mode switches are placed in the ohm position then both output circuits $F_1$ and $F_2$ carry B− potentials. These combinations are decoded within the digital control circuit. When the mode switches are placed in the D.C. position the polarity sensor PS provides the correct indication as to the polarity of the unknown source. The polarity of voltage $V_A$ applied to the active rectifier AR is opposite from the unknown source due to the inversion obtained with amplifier A (see FIG. 2). As will be recalled from the previous description of the operation of the active rectifier AR, when voltage $V_A$ is positive (representative of a negative unknown D.C. source) transistor 86 is reverse biased, whereas the transistor is forward biased when voltage signal $V_A$ is negative (representative of a positive unknown source). Thus, when the unknown source is of negative polarity, transistor 100 is reverse biased and transistor 102 is forward biased. With both switches 22 and 24 being in the D.C. position, output circuit $F_1$ will carry a B− potential, whereas output circuit $F_2$ will carry a B+ potential. However, when the unknown voltage source is a positive polarity then transistor 100 is biased into conduction which causes transistor 102 to be reverse biased. With the mode switches 22 and 24 in the D.C. position output circuits $F_1$ and $F_2$ will each carry a B+ potential.

ANALOG TO DIGITAL CIRCUITRY

Figure 4:
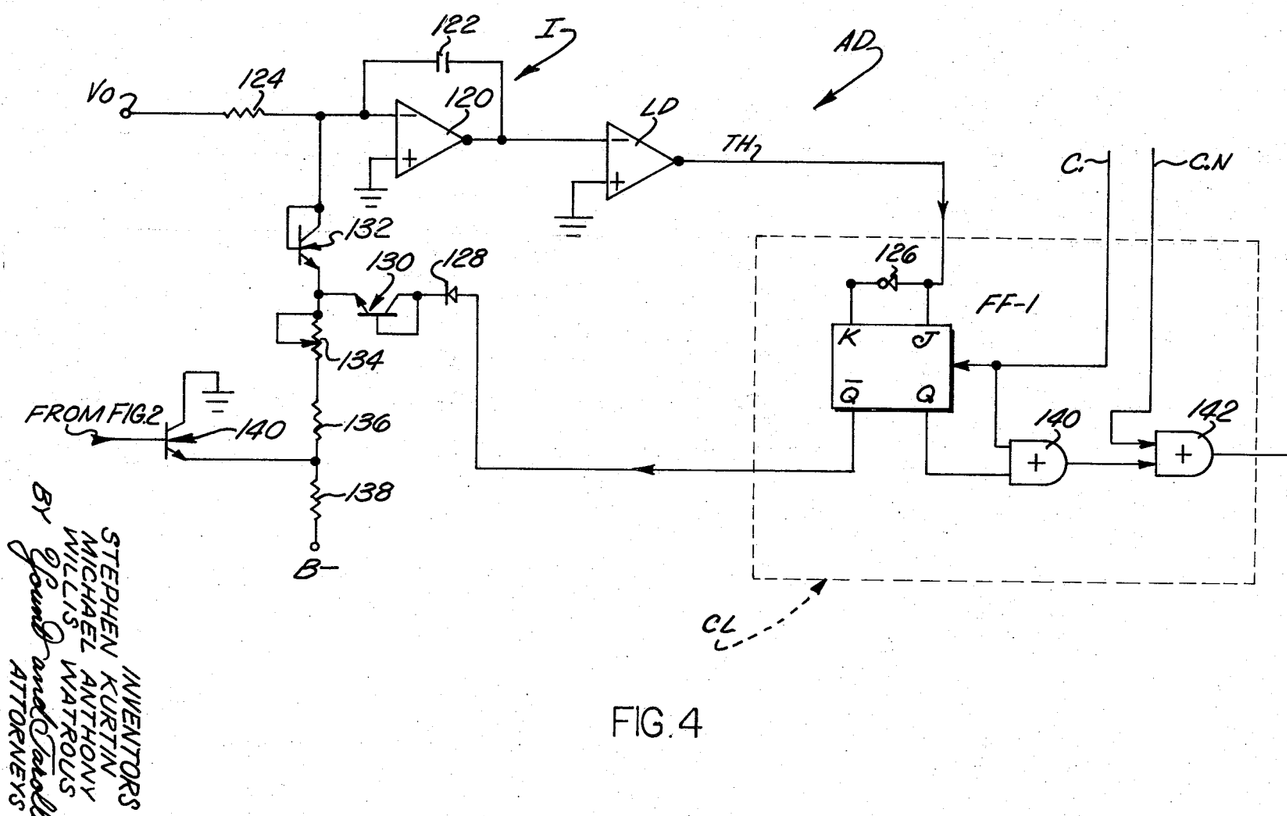
FIG. 4 is a schematic illustration of the preferred analog to digital converter in accordance with the invention.

The analog to digital converter circuit AD serves to convert the output voltage $V_O$ from the active rectifier AR into digital pulses for use by the digital control circuit DC in providing an output indication as to the magnitude of the unknown analog source. As best shown in FIG. 4, the analog to digital converter AD generally includes an integrating circuit I, and a level detector circuit LD coupled to a conversion logic circuit CL (which may be physically a part of the digital control circuit DC). The integrating circuit I includes an operational amplifier 120 having its non-inverting input connected to ground and a capacitor 122 connected between the inverting input and the output of the amplifier. Analog voltage $V_o$ is applied through a resistor 124 to the integrating circuit to charge capacitor 122. The level detector takes the form of an operational amplifier having its inverting input connected to the output of integrator I, and its non-inverting input connected to ground to define a reference potential. As capacitor 122 charges upon receipt of a positive analog signal $V_0$ the potential of integrator I approaches a negative level and as the voltage crosses through ground potential a positive output signal is obtained from the level detector LD and applied to flip-flop FF-1 in the conversion logic circuit CL. Flip-flop FF-1 is a JK type flip-flop having two input terminals J and K and two output terminals Q and Q̄. The positive output signal obtained from level detector LD is applied to input terminal J and the positive signal is inverted by an inverting amplifier 126 so that a negative signal is applied to input terminal K. Conversely, when the capacitor 122 discharges through ground potential toward a positive level, the level detector LD will provide a negative going signal to input terminal J and through inverter 126 a positive signal is applied to input terminal K.

Once a clock signal is applied to flip-flop FF-1 the signals applied to the input terminals J and K are transferred to the corresponding output terminals Q and Q̄. While capacitor 122 is charging, output terminal Q̄ carries a positive or binary "1" signal which is applied through a diode 128 and a diode connected transistor 130 to a capacitor discharge circuit. The discharge circuit includes a diode connected transistor 132, a potentiometer 134 and a pair of resistors 136 and 138 serving as a voltage divider all connected in series between the summing point of the integrator and the B— voltage supply source. The junction of resistors 136 and 138 is connected to the emitter of an NPN transistor 140 having its collector connected to ground and its base connected to the Zener diode 60 shown in FIG. 2. This latter circuit serves to provide a Zener reference potential at the junction of resistors 136 and 138 so as to provide a constant voltage source for discharging capacitor 122. So long as the output terminal Q̄ of flip-flop FF-1 carries a positive signal, transistor 132 in the discharge circuit is reverse biased so that the discharge circuit is ineffective. However, when output terminal Q̄ carries a negative signal, transistor 132 is forward biased permitting the discharge circuit to be effective so that capacitor 122 discharges through the path including transistor 132 and potentiometer 134.

In operation, as the input voltage $V_0$ is applied capacitor 122 will charge so that its output circuit carries a potential which varies in a negative direction. As this potential crosses the reference level or ground potential the level detector LD applies a positive or binary "1" signal to the flip-flop circuit FF-1. Consequently, a binary "1" signal is applied to input terminal J and a binary "0" signal is applied to input terminal K. However, until a clock pulse is applied to the flip-flop from the clock source no change will occur in the charging operation. Upon receipt of the next clock pulse, however, flip-flop FF-1 will be actuated so that its output terminal Q̄ carries a binary "0" signal and its output terminal Q carries a binary "1" signal. This causes the discharge circuit to be effective to discharge capacitor 122. As the capacitor is being discharged, output terminal Q applies an enabling signal to AND gate 140 to permit clock pulses during the discharge mode to be transmitted by this AND gate to a second AND gate 142. AND gate 142 is enabled only when its second input receives a binary "1" signal from a count now circuit CN indicative of a count now operation under the control of the digital controls DC (see FIG. 5). The gated clock pulses from AND gate 142 are applied to a counting circuit in the digital controls for purposes of counting the number of pulses which occur during the discharge operations within a given number of clock pulses. This will be described in greater detail hereinafter.

As the capacitor 122 discharges so that the output potential of integrator I crosses ground potential in a positive sense, the level detector LD applies a negative or binary "0" signal to flip-flop FF-1. This, however, does not prevent further discharge of capacitor 122 as the discharge circuit will continue to be effective until flip-flop FF-1 changes state. The flip-flop FF-1 will change state upon receiving the next clock pulse to cause output terminal Q̄ to carry a binary "1" signal and output terminal Q to carry a binary "0" signal. When output terminal Q carries a binary "0" signal AND gates 140 and 142 are rendered ineffective and, hence, no gated clock pulses are applied to the digital controls. Also, when output terminal Q̄ carries a positive potential transistor 130 back-biases transistor 132 to make the discharge circuit ineffective.

DIGITAL CONTROLS

The digital controls DC serve to receive clock pulses from clock C as well as the gated clock pulses from the analog to digital converter AD and control digital display means for providing an indication as to the magnitude of the unknown source as a function of the number of gated clock pulses counted during a period in which a fixed number of clock pulses are counted. Also, the digital controls include logic circuitry for decoding the binary information carried on output circuits $F_1$ and $F_2$ from the polarity sensor PS to provide the correct indication as to whether the instrument is being used for measuring an unknown A.C. signal or an unknown D.C. signal or for measuring ohms, and in the case of a D.C. signal for indicating the polarity of the signal received. In addition, the digital controls include circuitry for sequentially upranging or downranging the scaling of the input signal being applied to the analog to digital converter. These and other functions will be described in greater detail in the following discussion relative to FIG. 5.

Figure 5:
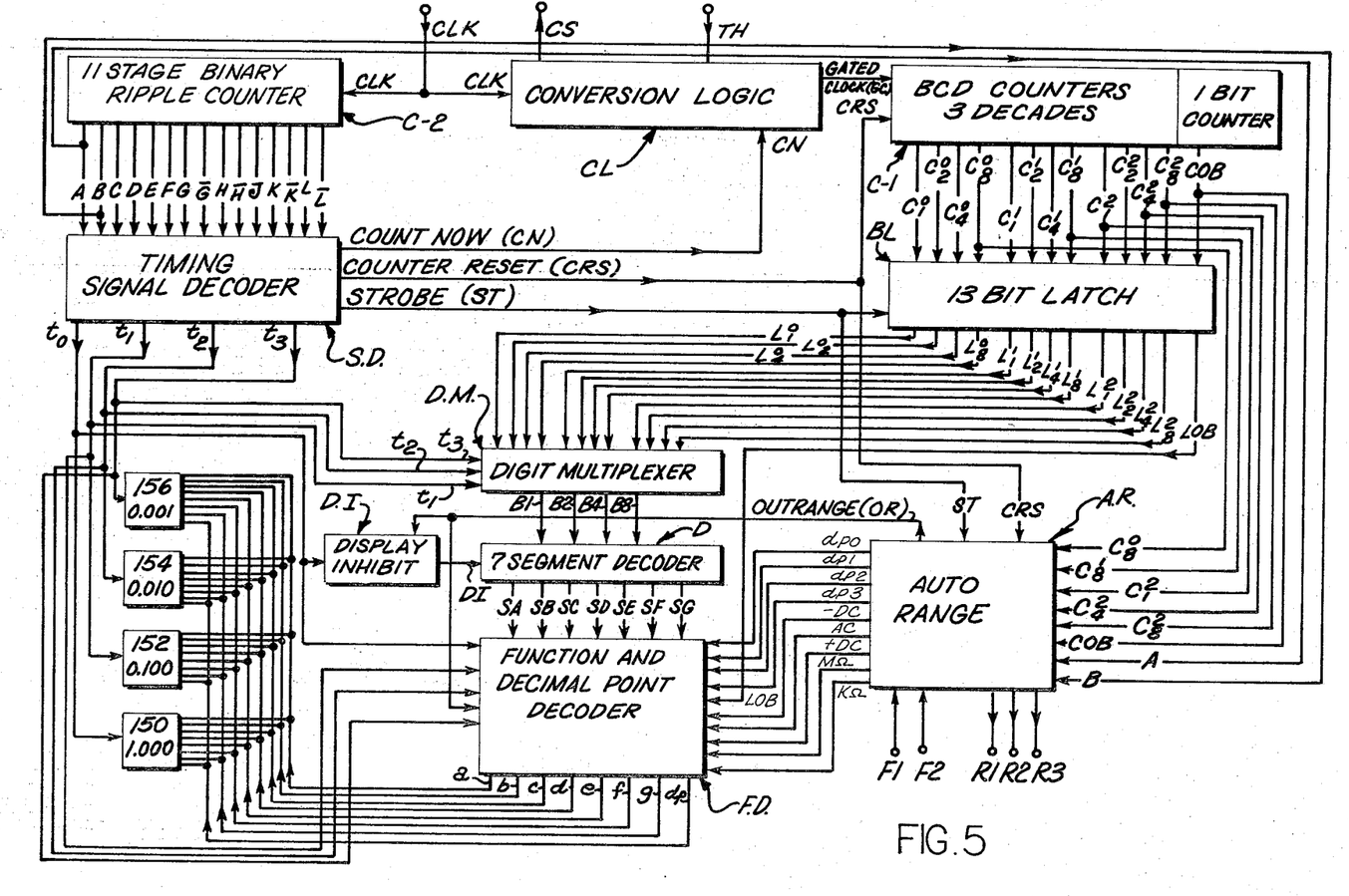
FIG. 5 is a block diagram illustration of the digital controls employed in the invention; and, FIG. 6 is a block diagram illustration of a portion of an autorange circuit which may be used in the invention.

The gated clock pulses GC taken from the output of AND gate 142 in the conversion logic circuit CL are applied to a counter C-1 which includes a conventional three decade BCD counter and a conventional one bit counter. Consequently, counter C-1 serves to provide a pattern of digital signals representative of a four digit number with the most signifcant digit being obtained from the one bit counter. As is conventional, each of the three least significant decades are provided with four output circuits for carrying patterns of binary coded signals indicative of the value of the prevailing count. The output circuits of counter C-1 are applied to a 13 bit latch circuit BL which may be of conventional design and include a plurality of flip-flop circuits taking the form of a register. Clock pulses from clock C are also applied to an eleven stage binary ripple counter C-2 for control and timing purposes. This counter has a plurality of output circuits, as shown in FIG. 5, for purposes of controlling various functions to be described in greater detail hereinafter. Ripple counter C-2 is a continuous counter which counts from 0 through 2,048 and then commences to count a new cycle. The output circuits are applied to a timing signal decoder SD which serves to provide control signals at suitable counts for controlling the digital control circuitry. Signal decoder SD has an output circuit CN which is connected to the enabling input of AND gate 142 in the conversion logic CL to enable the AND gate from a count 0 through a count of 2,016. During this period gated clock pulses obtained during the discharge operations of capacitor 122 in the analog to digital converter are applied to counter C-1. After a count of 2,016 is reached the next 32 counts, that is up to count 2,048, are used for such control purposes as disabling the gated clock pulses by removing the enabling signal from AND gate 142, strobing the bit latch circuit BL so that it receives the information from counter C-1, resetting counter C-1 and controlling autorange functions.

Once a count of 2,016 1 has been reached the enabling signal on the count now circuit CN is removed so that no additional gated clock pulses are applied to counter C-1. The signal decoder SD includes a strobe output circuit ST which will now carry an output signal for strobing the bit latch circuit BL so that the information contained in counter C-1 is transferred to the bit latch circuit. The output circuits for the three least significant digits of the bit latch circuit are applied to a digit multiplexer DM which may take any suitable form, such as a circulating shift register. The digit multiplexer is pulsed by time gating pulses taken from output circuits $T_1$, $T_2$ and $T_3$ of the signal decoder SD so that the information for the three least significant digits are multiplexed one at a time through the digital multiplexer DM to a segment decoder D which, for example, may take the form of a conventional four-line to seven-line BCD decoder. Decoder D is normally enabled by an enabling signal taken from the output of a display inhibit circuit DI. The enabling signal, however, is removed upon application to the display inhibit circuit of a blinking command from the outrange circuit OR of the autorange circuit AR to be described in greater detail hereinafter. The enabling signal is also removed during such time as timed gating signal is provided on output circuit $T_0$ of the signal decoder for the most significant digit of counter C-1. Output circuits $T_0$, $T_1$, $T_2$ and $T_3$ of the signal decoder sequentially carry gating signals and in that order to drive the visual readout circuitry which includes a units display 150, a tenths display 152, a one-hundreds display 154 and a one-thousands display 156. These visual displays preferably take the form of conventional seven bar, figure eight readouts, each having an additional circuit for providing a decimal point indication. The eight circuits for driving the seven bars and the decimal point are obtained from the function and decimal point decoder FD.

The function and decimal decoder FD is connected to the seven output circuits of the four-line to seven-line BCD decoder D for driving each of the visual displays 152, 154 and 156 in dependence upon which of the output circuits $T_1$, $T_2$ and $T_3$, respectively, carries a gating signal. However, upon receipt of a gating signal from output circuit $T_0$ of the timing signal decoder SD the most significant digit from the bit latch circuit is applied to the decoder through circuit LOB and this is decoded and applied by the function decoder FD to display 150. Since in the preferred embodiment only one digit, digit "1", is provided by the display 150 the segment bars are connected only so that only a digit "1" is energized. The "G" bar is used to indicate a negative polarity signal.

The autorange circuit AR includes circuitry for automatically scaling the input signal to the correct range of operation. Depending upon which range is selected, the decimal point of the visual display will be moved from just after the units designation to just after the tenths or one-hundreds or one-thousands, as the case may be. In addition to making the selection of the correct range of operation, the autorange circuit includes a decoding circuit for providing an output designation as to the correct decimal point position, and these designations are respectively carried on one of four output circuits DP0, DP1, DP2 and DP3, respectively. These circuits are applied to the function and decimal point decoder FD which decodes the designations and if a decimal point is to be illuminated for the particular digit being decoded, then the decimal point output DP of the function decoder is energized to carry a low signal for application to the anode line of the corresponding display 150, or 152, or 154, or 156.

The autorange circuit AR receives input signals from function circuits $F_1$ and $F_2$ (see FIG. 3) which indicate the mode of operation in effect; to wit, whether the instrument is being used for measuring ohms or an A.C. signal or a D.C. signal, and in the latter case the polarity involved. The autorange circuit decodes the signals carried on function lines $F_1$ and $F_2$ and applies the decoded information to the function and decimal point decoder FD over one of five output circuits indicated as $-D.C.$, A.C., $+D.C.$, $M\Omega$, and $K\Omega$. Thus, if the mode of operation is for measuring a D.C. signal and if the unknown signal is of positive polarity then output circuit $+D.C.$ carries an appropriate designation. If, however, the polarity is negative then the $-D.C.$ circuit carries an appropriate designation and this is decoded by the decoder FD and a visual display is obtained indicative of the negative polarity by energizing the G-bar of the units display 150. Although not shown in the drawings, the instrument may be provided with a display light which is energized whenever either the $-D.C.$ or $+D.C.$ output circuits of autorange circuit AR are energized. Similarly, if the function lines F1 and F2 indicate that an A.C. signal is being measured than the function decoder FD will decode the information carried on the A.C. output of the autorange circuit AR to energize a suitable light indicative that an A.C. signal is being measured. The same is true for measurements indicative of ohm readings, however whether a megohm designation is indicated or a kilohm designation is indicated is dependent upon information in the autorange circuit indicative of the range of operation involved. Thus, in the ohms measurement operation, kilohm and megohm designations are provided by actuation of output circuits $K\Omega$ and $M\Omega$, respectively.

Figure 6:
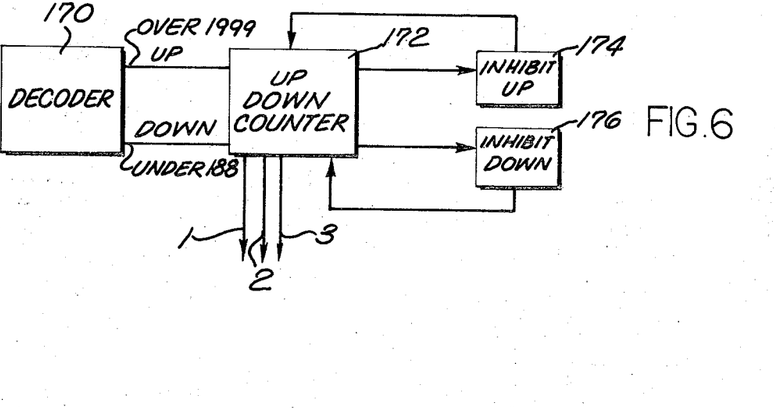

Depending on the magnitude of analog voltage $V_0$ applied to the analog to digital converter AD the counter C-1 may reach its full count during the count now period CN and, if so, this is indicative that the instrument must be upranged so as to scale down the magnitude of the input signal. Likewise, if the counter C-1 has a very small count at the end of a counting cycle this may be indicative that the magnitude of the input signal has dropped and, hence, its magnitude should not be scaled down to the extent that it had been. For example, if counter C-1 has counted less than 188 counts during a full count by counter C-2 the instrument should be downranged to the next lower range. The instrument may be sequentially downranged in this fashion until it reaches its lowest range at which point suitable circuitry is activated to prevent further downranging. Similarly, during the upranging operation circuitry is activated to prevent upranging beyond the uppermost range. This may be accomplished in various fashions and, for example, the autorange circuit may employ circuitry such as that shown in FIG. 6, wherein a decoder 170 provides an output signal to the up input of a conventional up-down counter 172 each time counter C-1 has counted more than 1999 gated clock pulses. As the magnitude of the unknown signal increases in magnitude the up-down counter sequentially counts up so as to count from 0 to 1 to 2 and then to 3 and is arranged to have output circuits 1, 2 and 3 to sequentially carry control signals in accordance with the pulse count. However, once the instrument has attained its top range, in this case at a count of 3 for the up-down counter, then an inhibit circuit 174 decodes this indication to inhibit the up-down counter from responding to further up counts. Similarly, each time decoder 170 decodes a count from counter C-1 less than 188 a pulse is applied to the down input terminal of the up-down counter 172 so that the down counts are subtracted from the up counts. Once the up down counter attains a total count of zero an inhibit down circuit 176 decodes this information to inhibit the up-down counter 172 from responding to further down counts. It is in this manner that the autorange circuit AR sequentially upranges and sequentially downranges the scaling of the input signal. In the example given, the status of such an up-down counter is decoded so that when no uprange scaling is involved none of the output circuits $R_1$, $R_2$ or $R_4$ are actuated. As upranging is required range circuits $R_1$ and $R_2$ are sequentially energized and for the next higher range both range circuits $R_1$ and $R_2$ are energized. For ohm measurements one additional range is employed with an additional range circuit $R_4$. These range circuits $R_1$, $R_2$ and $R_4$ are connected to the scaling circuit shown and described in greater detail hereinbefore relative to FIG. 2.

It is contemplated that when the instrument is in its uppermost range for either A.C. or D.C. or ohm measurements an increase in the unknown signal beyond the uppermost range will cause the visual displays 150, 152, 154 and 156 to blink on and off at a rate sufficiently slow to indicate an outrange condition to an observer. The timing of the blinking of these visual displays is obtained by monitoring the two most significant digits of counter C-2. Thus, output circuits A and B of counter C-2 have a high condition 75 percent of each counting cycle, with output circuit A being high 50 percent of the time and output circuit B being high 25 percent of the time, but not high together. This is utilized during outrange conditions to form a blinking command on outrange circuit OR which serves to gate the display inhibit circuit DI and the function decoder FD to control the blinking of the digital displays. As to whether or not an outrange command is given on output circuit OR is dependent upon the count attained by counter C-1 during the uppermost range and the level of the count is dependent upon the mode of operation; to wit, whether the instrument is being used for measuring an A.C. signal or an unknown D.C. signal or for ohm measurements. It is contemplated that the blinking commands will be given at different counts for these different modes of operation. If a count of 500 is reached during A.C. measurements the outrange command will be given. Similarly, if during D.C. measurements the count exceeds 1,000 counts an outrange command is given. For ohm measurements a count of 2,000 will produce an outrange command. The autorange circuit AR includes suitable circuitry for decoding the output circuits of counter C-1 to provide an appropriate indication of an autorange condition.

The invention has been described with reference to a preferred embodiment, however, it is to be appreciated that the invention is not limited to same as various modifications may be made without departing from the spirit and scope of the invention as defined in the appended claims.

What is claimed is:

1. Apparatus for converting an analog signal into a digital signal and comprising:
   energy storage means;
   charging circuit means for storing energy in said energy storage means at a rate dependent on the magnitude of a said analog signal;
   discharging circuit means for discharging energy from said energy storage means at a relatively constant rate;
   means for monitoring said energy storage means and providing an output indication each time said energy storage means charges past a predetermined level in one direction and each time said energy storage means discharges to at least past said predetermined level in the opposite direction;
   a source of clock pulses; and
   control means for receiving said clock pulses for controlling said circuit means for alternate charging and discharging operations each commencing in dependence upon concurrent occurrence of a respective one of said output indications and a said clock pulse.

2. Apparatus as set forth in claim 1 including means for providing an output indication indicative of the magnitude of said analog signal in dependence upon the number of clock pulses occurring during the said discharge operations.

3. Apparatus as set forth in claim 1 including means for providing an output indication of the magnitude of said analog signal in dependence upon the ratio of the number of clock pulses occurring during the discharging operations and a predetermined number of said clock pulses.

4. Apparatus as set forth in claim 1 including gating means for providing gated clock pulses during said discharge operations and first and second digital counting means for respectively counting said clock pulses and said gated clock pulses and circuit means for providing an output indication as to the magnitude of a said analog signal in dependence upon the number of counted gated clock pulses occurring during a period in which a predetermined number of said clock pulses are counted.

5. Apparatus as set forth in claim 4 wherein said first counting means includes means for counting N pulses during each counting cycle of operation, means for controlling said gating means for a predetermined number of said N pulses so that only a corresponding predetermined number of gated clock pulses may be counted by said second counting means during each said counting cycle of operation.

6. Apparatus as set forth in claim 5 including circuit means controlled by said first timing means once at least said predetermined number of said N pulses have been counted for determining the actual number of said gated clock pulses which have been counted by said second counting means.

7. Apparatus as set forth in claim 6 including register means for providing a digital manifestation as to said actual number of said gated clock pulses.

8. Apparatus as set forth in claim 7 including decoder means responsive to said digital representation for providing output signals in accordance with the decimal value thereof, and readout means for providing a corresponding decimal readout.

9. Apparatus as set forth in claim 7 wherein said digital manifestation is representative of a plural digit decimal number, and decoder means responsive to said digital representation for providing a plurality of patterns of output signals with each said pattern being representative of the decimal value of an associated one of said plural digits, and plural digit readout means responsive to said patterns of output signals for providing a corresponding decimal readout.

10. Apparatus as set forth in claim 1 wherein said discharging circuit means is connected to said energy storage means and includes switching means for, when actuated, completing a discharge path for said energy storage means to a reference point exhibiting a substantially constant D.C. voltage level.

11. Apparatus as set forth in claim 1 including input circuit means for receiving a said analog signal and output circuit means for applying a unipolar analog signal to said energy storage means, unipolar circuit means interposed between said input and output circuit means for providing at said output circuit means a unipolar analog signal of a given polarity and of a magnitude dependent on that of a received said analog signal.

12. Apparatus as set forth in claim 11 wherein said discharge circuit means is connected to said energy storage means and includes switching means for, when actuated, completing a discharge path to a reference point exhibiting a substantially constant potential and of a polarity opposite from that of said given polarity.

13. Apparatus as set forth in claim 12 wherein said switching means includes a first semiconductor means normally reverse biased and wherein said control means includes circuit means for forward biasing said semiconductor means to complete said discharge path for discharging operations.

14. Apparatus as set forth in claim 11 wherein said unipolar circuit means includes active rectifier means for providing a said unipolar analog signal.

15. Apparatus as set forth in claim 14 including polarity sensor means for providing an output indication as to the polarity of a received said analog signal.

16. Apparatus as set forth in claim 1 including input signal scaling means preceeding said energy storage means for scaling the amplitude of a said analog signal.

17. Apparatus as set forth in claim 16 wherein said scaling means includes a plurality of selectable scaling circuits for respectively different ranges of values of the amplitude of a said analog signal, and control means for selecting said scaling circuits.

18. Apparatus as set forth in claim 17, wherein said control means includes circuit means for selecting said scaling circuits in such a manner that said apparatus is sequentially upranged as the magnitude of a said analog signal increases and is sequentially downranged as the magnitude of a said analog signal decreases.

19. Apparatus as set forth in claim 18, wherein said control means includes decoding means responsive to an outrange indication that a said analog signal has a magnitude beyond the uppermost range of operation, and means for providing a visual indication in response to said outrange indication.

20. Apparatus as set forth in claim 1 including digital output circuit means for providing an output indication of the magnitude of a said analog signal in dependence upon the number of clock pulses occurring during such discharge operations over a counting cycle dependent on a fixed number of clock pulses, said digital output circuit means including maximum value detecting means for providing an output indication when the analog signal exceeds a predetermined level, and scaling means responsive to a said output indication for scaling the magnitude of said analog signal.

21. Apparatus for converting an analog signal into a digital signal and comprising:
  energy storage means;
  first circuit means for continuously applying energy to said storage means to be stored thereby and at a rate dependent on the magnitude of a said analog signal;
  second circuit means for periodically discharging energy from said energy storage means at a relatively constant rate;
  means for monitoring said energy storage means and providing a first output indication each time said stored energy increases past a predetermined level in one direction and a second output indication each time said stored energy decreases to at least past said predetermined level in the opposite direction;
  a source of clock pulses; and
  control means for receiving said clock pulses for controlling said second circuit means for periodically discharging energy from said storage means so that each discharge period commences in dependence upon concurrent occurrence of a said first output indication and a said clock pulse and terminates in dependence upon concurrent occurrence of a said second output indication and a said clock pulse.

* * * * *